Patented Mar. 23, 1943

2,314,322

UNITED STATES PATENT OFFICE 2,314,322

PRODUCTION OF ARYL-SUBSTITUTED PHENOLS

Waldo C. Ault, Springfield, Pa., assignor to The United Gas Improvement Company, a corporation of Pennsylvania No Drawing. Application November 3, 1939, Serial No. 302,698

9 Claims. (Cl. 260—619)

This invention relates to the conversion of aryl-substituted phenolic materials to other more desirable phenolic materials.

More particularly, this invention relates to the catalytic conversion of di-aryl-substituted phenols or other poly-aryl-substituted phenols to mono-aryl-substituted phenols.

Aryl-substituted phenolic materials are important in a number of industrial applications, particularly as insecticides and germicides, and as starting materials for the manufacture of numerous synthetic resins.

Aryl-substituted phenolic materials may, of course, contain one or more substituent groups depending upon the extent of the substitution.

Exemplary of aryl-substituted phenols may be mentioned mono and di styryl-, indenyl-, phenyl-, and benzyl-phenols.

Generally speaking, the mono-aryl-substituted phenols are more desirable than di- and other poly-aryl-substituted phenols. For example, mono-aryl-substituted phenols are less difficult to purify than di- or other poly-aryl-substituted phenols because of their lower boiling points and their higher alkali solubilities. Furthermore, mono-aryl-substituted phenols as herein defined condense with aldehydes and other resin-forming reactants more readily than poly-aryl-substituted phenols, and more easily give resins possessing the desired characteristics of hardness, resistance to weathering, resistance to solvents and the like.

Although mono-aryl-substituted phenolic materials are more desirable than di- and other poly-aryl-substituted phenolic materials, it has been found difficult to prepare the mono-aryl-substituted materials without at the same time preparing large quantities of the less desirable poly-aryl-substituted materials.

General methods for the preparation of substituted phenols consist of contacting phenol with unsaturated hydrocarbons, hydrocarbon halides or alcohols, or dimers and trimers of unsaturated hydrocarbons in the presence of a condensing catalyst such as sulfuric acid, siliceous materials, or catalysts of the Friedel and Crafts type such as anhydrous aluminum chloride. Homologs of phenols, such as cresol, chloro-phenol and the like may, of course, be substituted for the phenol in such processes.

In present-day methods for the preparation of aryl-substituted phenols such as those just described less desirable di- and other poly-aryl-substituted phenols are produced in large quantities relative to the more desirable mono-aryl-substituted phenols.

For example, in the production of styryl-phenols by reaction between phenol and styrenes, when equal molecular quantities of phenol and styrene are employed, the percentage of di- and other poly-aryl-substituted phenols produced exceeds the percentage of mono-aryl-substituted phenols produced. The yield of mono-aryl-substituted phenols may be increased appreciably by increasing the molar ratio of phenol to unsaturated hydrocarbons, but commercially this is a disadvantageous procedure since the recovery of unreacted phenol is expensive and requires the installation of costly equipment. Therefore, in commercial practice, generally speaking, equimolecular quantities of phenol and unsaturated aromatic hydrocarbons or hydrocarbon halides or alcohols, are employed with the resultant production of considerable yields of the less desirable di- and other poly-aryl-substituted phenols containing two or more substituent aryl groups.

I have found that di- and other poly-substituted phenols containing two or more substituent aryl groups may easily and readily be converted in excellent yield to the more valuable substituted phenols containing only one substituent aryl group.

The conversion of di- and other poly-aryl-substituted phenols to mono-aryl-substituted phenols as described herein is effected by the reaction of the di- or other poly-aryl-substituted phenols with additional phenol in the presence of a catalyst of the Friedel and Crafts type, such as, for example, aluminum chloride, ferric chloride, boron fluoride and the like.

For example, after carrying out the above described general process for the production of aryl-substituted phenols, the reaction product consists of a mixture of unreacted phenol, unreacted aromatic hydrocarbons, mono-aryl-substituted phenols and di- and other poly-aryl-substituted phenols. The mono-aryl-substituted phenols may be separated from the reaction product and the remainder of the reaction product may be treated with additional phenol to convert the di- and other poly-aryl-substituted phenols into mono-aryl-substituted phenols. Or, the components of the reaction product may all be separated, and the di- and other poly-aryl-substituted phenols thus obtained may be further reacted with additional phenol.

If desired, an additional quantity of reactive organic material such as unsaturated aromatic hydrocarbons, may be added to take part in the reaction between the poly-aryl-substituted phenols and the additional phenol.

The exact procedure which will give best results will depend upon the specific nature of the reaction.

The reactions for the production of mono-aryl-substituted phenols by the combined process herein described may be represented as follows:

$$2Ph + (x+1)R \rightarrow PhR + PhR_x (+Ph+R)$$
$$(x-1)PhR_x + Ph \rightarrow xPhR$$

in which Ph represents a phenolic material, R represents a reactive hydrocarbon material such as an unsaturated aromatic hydrocarbon, a halide or an alcohol, PhR represents a mono-aryl-substituted phenol and $PhR_x$ represents a di- or other poly-aryl-substituted phenol.

It is to be understood that these equations are merely general illustrative equations to indicate the general steps of the process. They are not limiting of the process and are offered only as an explanation of the reaction which appears to take place.

A preferred method of operation consists of uniting the residues of a previous batch or run with the particular phenol which is to be used in the next batch or run, in the presence of a catalyzing agent. The residues of the previous batch or run may or may not be purified by some process such as washing, distillation, solvent extraction or the like as desired.

Following the reaction of the di- and other poly-aryl-substituted phenol with the excess phenol, the catalysts employed may be neutralized and removed in any desired manner, such as, for example, by water washing or by washing with a solution of alkali or alkaline earth hydroxides, carbonates or bicarbonates. Such a washing procedure will also remove any excess unreacted phenol which may be present in the mixture.

The neutralized mixture of the reaction product may then be separated by any desired method.

For example, fractional distillation may be utilized to separate the products obtained by the reaction between the poly-aryl-substituted phenols and additional phenol.

I have found that fractional distillation gives excellent separation and recovery of the desired aryl-substituted phenols. The distillation may be discontinued as soon as the desired mono-aryl-substituted phenols have been taken over, or the distillation may be continued to give any higher boiling poly-aryl-substituted phenols.

The poly-aryl-substituted phenols obtained in the fractional distillation process may be further reacted with additional phenol, and, if desired, with additional unsaturated aromatic hydrocarbons such as styrene-containing materials, or the like, thus making possible a cyclic production of mono-aryl-substituted phenols, the undesired poly-aryl-substituted phenolic materials being recycled to the initial stage of the process for further reaction with additional phenol. Fractional distillation has also been found highly suitable for the separation of the reaction products obtained in the initial stage of the reaction, i. e., the reaction of phenol with unsaturated aromatic hydrocarbons and the like. Excellent separation and recovery of the unused hydrocarbons, and unreacted phenols as well as the mono- and poly-aryl-substituted phenols is obtained. After removal of the desired mono-aryl-substituted phenols, the poly-aryl-substituted phenolic materials either with or without any other products that may be present in the reaction product may be further reacted with additional phenol and, if desired, with additional hydrocarbons.

This catalytic process for the conversion of poly-aryl-substituted phenol to mono-aryl-substituted phenol may be performed at any suitable temperature say from 0° C. up to 350° C. and at pressures varying from sub-atmospheric to super-atmospheric. For example, it has been found that reaction temperatures from 60° C. to 200° C. at atmospheric pressure are suitable for the production of mono-aryl-substituted phenols in high yields.

The process may be conducted in batch, semi-continuous or continuous operation. Although batch operation will give excellent results, it has been found preferable to operate in a continuous manner.

The amount of catalysts which may be used will depend upon the specific nature of the products being reacted and also upon the specific catalyst chosen. Generally speaking, the quantity of catalysts which may be employed in any given reaction will vary between 0.1% and 10% by weight based on the phenol used. Excellent results may be obtained when from 1% to 5% of catalysts by weight based on the phenol is employed.

Likewise, the time of reaction will be found to vary considerably depending upon the nature of the reactants, the catalysts, and the temperature used, and other variable factors. Reaction times varying from two minutes up to several hours may be found desirable under different specific conditions. In general, under optimum conditions of treatment, it has been found that the time of reaction may be varied from one half hour up to twelve hours with good results, and a preferable reaction time is one of 1 to 8 hours.

Reference has been made to the neutralization of the catalyst employed and of unreacted phenol with a solution of alkali or alkaline earth hydroxides, carbonates or bicarbonates. Exemplary of such a procedure which gives excellent results may be mentioned the addition to a reaction mixture at the end of the reaction, of the theoretical quantity of sodium carbonate or sodium bicarbonate required to neutralize the acidic catalyst. The sodium carbonate or sodium bicarbonate may be dissolved in a small amount of water if desired before the addition to the reaction mixture containing the substituted phenol. The reaction mixture to which the alkaline neutralizing substance has been added is then mixed by any desirable agitaton means.

The herein described process is particularly adapted to the removal of unsaturated aromatic hydrocarbons and other reactive hydrocarbons from hydrocarbon fractions containing more or less of these materials. For example, a hydrocarbon fraction prepared by the fractional distillation of light oil obtained in the manufacture of artificial gas (i. e., an aromatic light oil), generally contains some unsaturated aromatic hydrocarbons such as styrene, indene and the like. By reacting such a hydrocarbon fraction containing unsaturated aromatic compounds with phenol, the unsaturated aromatic hydrocarbons and other reactive hydrocarbons will combine with the phenol to form various substituted phenols, and the latter may then be removed from the remaining saturated hydrocarbons. The mixture containing various aryl substituted phenols may then be further reacted with additional quantities of phenol in accordance with the procedure herein described, to produce high yields of mono-aryl-substituted phenols.

*Example*

A hydrocarbon fraction boiling in the range between 160 and 169° C. was prepared by the fractional distillation of a light oil obtained in the manufacture of gas. This fraction contained a substantial proportion of unsaturated aromatic hydrocarbons. The fraction was reacted with phenol using 0.2% sulfuric acid as a catalyst. The unsaturates in the light oil fraction were found to combine with the phenol to produce various aryl-substituted phenols, leaving the saturated hydrocarbons in such a form as to be readily recovered (for instance, by fractional distillation) for use as solvents or chemical intermediates. Fractional distillation of the aryl-substituted phenols obtained by this reaction gave two fractions.

The first fraction was found to be a mono-aryl-substituted phenol boiling within the range between 143 and 155° C. at approximately 5 mm. pressure absolute.

The second fraction, boiling within the range between 185 and 190° C. at approximately 5 mm. pressure absolute, was found to contain predominantly poly-aryl-substituted phenols.

The higher boiling fraction consisting of poly-aryl-substituted phenols was then reacted with additional phenol for a period of approximately 6 hours at a temperature of between 80 and 90° C., in the presence of 5% aluminum chloride based on the weight of the phenol, as a catalyst. The resulting reaction product was diluted with an equal volume of benzene and thoroughly washed with water. It was then fractionally distilled. There was obtained a fraction boiling within the temperature range between 155 and 160° C. at approximately 5 mm. pressure absolute, which fraction consisted of approximately 70% of the entire reaction product. This fraction was found to consist essentially of mono-aryl-substituted phenol.

Although specific procedures for the catalytic conversion of di- and other poly-aryl-substituted phenols to mono-aryl-substituted phenols have been particularly described herein, it is to be expressly understood that these are illustrative only of the invention, and that the invention is intended to be limited only as required by the prior art. Therefore, changes, omissions, additions, substitutions, and/or modifications may be made without departing from the spirit of the invention.

I claim:

1. A process for the production of a mono-aryl-substituted phenol from aromatic light oil material containing saturated and unsaturated hydrocarbon material which comprises reacting said light oil material with phenol in the presence of a relatively small quantity of a condensing catalyst; distilling the reaction product to obtain a fraction comprising mono-aryl-substituted phenol and a fraction comprising poly-aryl substituted phenol; and a fraction of unsaturated aromatic hydrocarbon material reacting the poly-aryl substituted phenol fraction with additional phenol at a temperature above 60° C. and in the presence of a relatively small quantity of aluminum chloride as catalyst; neutralizing the catalyst at the end of the reaction point; and separating mono-aryl-substituted phenol from the reaction product by fractional distillation.

2. A process for obtaining a saturated aromatic hydrocarbon material of solvent grade and valuable phenolic products from an aromatic light oil which comprises distilling said light oil to obtain a fraction comprising saturated and unsaturated aromatic hydrocarbons; reacting said fraction with phenol in the presence of a relatively small quantity of a condensing catalyst to produce mono-aryl- and poly-aryl-substituted phenols; subjecting the reaction product to fractional distillation to separate unreacted phenol, mono-aryl-substituted phenol, poly-aryl-substituted phenol, and a saturated aromatic hydrocarbon material suitable for use for solvent purposes; and reacting said separated poly-aryl-substituted phenol with additional phenol to produce additional mono-aryl-phenol.

3. A process for the production of mono-aryl-substituted phenolic material from an aromatic light oil hydrocarbon fraction containing unsaturated hydrocarbon material, which comprises reacting said aromatic light oil fraction with a phenol in the presence of a condensing catalyst to produce aryl-substituted phenolic material including poly-aryl-substituted phenolic material, separating the phenolic material including said poly-aryl-substituted phenolic material from the non-phenolic material, reacting said separated poly-aryl-substituted phenolic material with a phenol in the presence of a catalyst to produce mono-aryl-substituted phenolic material therefrom.

4. A process for the production of mono-aryl-substituted phenolic material from an aromatic light oil hydrocarbon fraction containing unsaturated hydrocarbon material, which comprises reacting said aromatic light oil fraction with a phenol in the presence of a condensing catalyst to produce aryl-substituted phenolic material including mono- and poly-aryl-substituted phenolic material, separating the phenolic material from the non-phenolic material, thereafter separating said poly-aryl-substituted phenolic material from said separated phenolic material and reacting said separated poly-aryl-substituted phenolic material with a phenol in the presence of a catalyst to produce further mono-aryl-substituted phenolic material therefrom.

5. A process for obtaining a saturated solvent oil and valuable phenolic products from an aromatic light oil fraction containing unsaturated aromatic hydrocarbon material and saturated hydrocarbon material, which comprises reacting a phenol with said fraction in the presence of a condensing catalyst, producing thereby aryl-substituted phenolic material including poly-aryl-substituted phenolic material, separating the reaction products including aryl-substituted phenolic material together with any unreacted phenol from the unreacted hydrocarbon material, thereby recovering said unreacted hydrocarbon material in the form of a solvent oil substantially free from unsaturated aromatic material, and condensing said poly-aryl-substituted phenolic material with additional phenol to produce mono-aryl-substituted phenolic material therefrom.

6. A process for the production of mono-aryl-substituted phenolic material from a styrene containing light oil hydrocarbon fraction, which comprises reacting said styrene containing light oil fraction with a phenol in the presence of a condensing catalyst to produce aryl-substituted phenolic material including poly-aryl substituted phenolic material, separating the phenolic material including said poly-aryl-substituted phenolic material from the non-phenolic material, reacting said separated poly-aryl-substituted phenolic material with a phenol in the presence of a catalyst to produce mono-aryl-substituted phenolic material.

7. A process for the production of mono-aryl-substituted phenolic material from a light oil styrene hydrocarbon fraction containing saturated aromatic hydrocarbon material, which comprises reacting said styrene light oil fraction with a phenol in the presence of a Friedel and Crafts type catalyst to produce aryl-substituted phenolic material including poly-aryl-substituted phenolic material, separating the phenolic material including said poly-aryl-substituted phenolic material from the non-phenolic material, reacting said separated poly-aryl-substituted phenolic material with a phenol in the presence of a Friedel and Crafts type catalyst to produce mono-aryl-substituted phenolic material therefrom.

8. A process for the production of mono-aryl-substituted phenolic material from an aromatic light oil hydrocarbon fraction containing unsaturated hydrocarbon material, which comprises reacting said aromatic light oil fraction with a phenol in the presence of a condensing catalyst to produce aryl-substituted phenolic material including di-aryl-substituted phenolic material, separating the phenolic material including said di-aryl-substituted phenolic material from the non-phenolic material, reacting said separated di-aryl-substituted phenolic material with a phenol in the presence of a catalyst to produce mono-aryl-substituted phenolic material therefrom.

9. A process for the production of mono-aryl-substituted phenolic material from an aromatic light oil hydrocarbon fraction containing unsaturated hydrocarbon material, which comprises reacting said aromatic light oil fraction with a phenol in the presence of a Friedel and Crafts type catalyst to produce aryl-substituted phenolic material including di-aryl-substituted phenolic material, separating the phenolic material including said di-aryl-substituted phenolic material from the non-phenolic material, reacting said separated di-aryl-substituted phenolic material with a phenol in the presence of a catalyst to produce mono-aryl-substituted phenolic material therefrom.

WALDO C. AULT.